No. 734,482. Patented July 21, 1903.

UNITED STATES PATENT OFFICE.

SAMUEL RUCKER WHITALL, OF THE UNITED STATES ARMY, ASSIGNOR, BY DIRECT AND MESNE ASSIGNMENTS, OF ELEVEN-TWENTIETHS TO FRANK MACOMB WHITALL AND JOSEPH R. EDSON, OF WASHINGTON, DISTRICT OF COLUMBIA.

PROCESS OF TREATING WURTZILITE FOR PAINTS, VARNISHES, &c.

SPECIFICATION forming part of Letters Patent No. 734,482, dated July 21, 1903.

Application filed May 5, 1902. Serial No. 105,908. (Specimens.)

*To all whom it may concern:*

Be it known that I, SAMUEL RUCKER WHITALL, a citizen of the United States, residing at Fort Myer, in the State of Virginia, have invented certain new and useful Improvements in Processes of Treating Wurtzilite to Render it Suitable for the Production of Paints, Varnishes, &c., and the so-called "Plastic Articles;" and I do hereby declare the following to be a full, clear, and exact description of the invention, such as will enable others skilled in the art to which it appertains to make and use the same.

Of the material called "wurtzilite" there are at least two varieties, one harder and the other softer. I have discovered that each is soluble in petroleum, either crude petroleum or its distillates, and that when a plastic mass or solution reverts by evaporation to a consistent solid mass said mass recovers substantially its original properties, with this exception, however, that the mass is now soluble in any of the ordinary solvents of rubber and also, of course, in petroleum or its distillates. The solution of the wurtzilite is effected by merely bringing the material into intimate contact with petroleum or its distillates. The mass is preferably reduced to a fine condition or pulverized, and the solvent actions of petroleum, &c., may be aided by moderate heat.

My invention therefore consists in the mode of making articles of commerce containing wurtzilite, as hereinafter more fully described and particularly pointed out in the claims.

Wurtzilite is a mineral without any determinate form and would be classed as amorphous. It is never found crystallized. By reflected light it is of a dark, nearly black, brownish color, fracture conchoidal, streak brown; by transmitted light through a thin piece of a dark orange red, nearly brown. When at the ordinary temperature, it is strong, tough, and requires a sharp heavy blow to break it. When warmed, it is tough and somewhat elastic, not oxidizable, not affected by the strongest acids nor any combination of acids, either cold or hot, except by a slight discoloration; not soluble in alkalies nor in any of the ordinary solvents of india-rubber, except coal-tar naphtha, which does not entirely dissolve it unless used in very large proportion to the quantity of wurtzilite; soluble in petroleum. By distillation it gives off gas and four or five oils, a heavy white oil, a brown oil, a rich yellow golden-colored oil, leaving a thick pasty residue, and has about ten per cent. of fixed carbon, showing perhaps a trace of sulfur.

Wurtzilite is valuable as an insulating substance, as a paint, a varnish, a lacquer, and for the numerous so-called "plastic articles" too numerous to mention. It can be vulcanized in the same general manner as india-rubber. Combined with india-rubber as an adulterant it can be used as india-rubber on cloth or other fabrics as a waterproof material. For the insulation of wires, conduit-pipes, and electrical appliances it is invaluable by reason of its strength, toughness, and non-oxidizable properties, being entirely waterproof. Having dissolved the mineral without destroying any of its valuable commercial properties for use in the arts, either with or without the aid of heat, my prepared or allotropic wurtzilite—that is, a mineral having the essential properties of wurtzilite which has been reduced by petroleum or its distillates to a condition for use in making the so-called "plastic articles" or for use in making paints, varnishes, or lacquers—being itself soluble in the solvents of india-rubber can be sold to manufacturers for use in making either of the articles of commerce herein indicated.

I will now describe my preferred method of preparing wurtzilite for use for commercial purposes. The mineral is mixed with a solvent, hereinbefore described, and ground under atmospheric pressure in a suitable apparatus—say a paint-mill of any preferred construction—set to grind to the fineness of a sixty-mesh screen, more or less, as may be desired. To accomplish this, the mineral is first crushed or broken up into small pieces to enable it to be readily ground to the desired fineness. I then take the pulp or powder and place it in suitable vessels—say kettles of pressed steel, or pots of cast-iron, or any suitable vessel of proper size to suit the manufacturer—and place the vessels on a furnace or stove so constructed that when the vessels or kettles are placed therein none of the flame will press up around the sides of the furnace or through the openings thereof in which the kettles are to be placed. Any crevices in the furnace should be well luted or closed to prevent any flame or spark from coming into contact with the contents of the kettles. When it is desired to dissolve this mineral in large quantities, a suitable furnace of brick of any length desired may be employed, the top of which should be preferably of cast-iron, with openings therein to fit the vessels to be used thereon. The furnace may be provided with a fire-box, doors, flues, and dampers to regulate the heat and draft. Tight-fitting covers should be provided to place over the openings when one or more of the vessels are removed from the furnace. The finely-ground material or pulp is placed in a vessel with petroleum-oil, either crude or refined oil, but preferably any petroleum that does not contain the mineral wax known as "paraffin." After the materials have become thoroughly mixed the vessel is covered and placed on the furnace and heated to the necessary temperature to resolve the material to a plastic or liquid state, as desired, occasionally stirring the contents of the vessel to dissolve the wurtzilite, which should be thoroughly dissolved in from one to two hours, according to the fineness of the pulp. The quantity of oil to be incorporated with the pulp should be the smallest quantity that is necessary to dissolve the pulp. When after examination no undissolved particles are found, the pulp is readily poured out upon slabs of stone, a clean wooden table, or into suitable molds to cool or harden.

The foregoing constitutes the quickest and my preferred method of dissolving wurtzilite, comprising the use of heat with the solvent petroleum, as hereinbefore described; but I have often obtained satisfactory results as follows: Break the wurtzilite into pieces small enough to be readily ground in a grinding-mill or to a fineness sufficient to hold the oil and prevent its separating and running out of the mill, then grind the mineral with the oil, after which it will be found that most of the mineral has been dissolved. Any residue of the mineral can be dissolved in the manner previously described or it can be strained off and then be used over in the mill with a fresh supply of oil and pulp.

It will be found advantageous to use the smallest quantity of oil that will readily dissolve the pulp, for the reason that most of the oil will evaporate during the process, and it is desirable to have the after product as free from petroleum as possible if it is to be used in the manufacture of certain kinds of paint or fine varnish or for incorporating with india-rubber with the aid of the rubber solvents—say naphtha, benzin, bisulfid of carbon, or any other solvent of india-rubber or gutta-percha. After dissolving and before pouring the resulting gum or product out of the vessel if it is to be used as paint for iron or metal—such as bridges, the smoke-stacks of steamers or locomotives, the heads of boilers, or for coating pipes of iron for use under ground or under water, or for any iron or steel work as a preservative against rust—sufficient refined petroleum with or without any additional suitable drying material should be added to give the mass the consistency of paint, which will thoroughly coat the surface to be painted.

In using the wurtzilite product with linseed-oil as a paint preferably strain the dissolved product while hot and allow it to run into a suitable vessel containing linseed-oil, either raw or boiled, as desired. To this add and thoroughly mix or incorporate litharge, copal varnish, or any suitable drier and then place the product in cans for future use, first allowing the paint to cool, or the dried product may be broken up into small pieces and then deposited in raw or boiled linseed-oil, heated sufficiently to dissolve the product. If litharge is added while the mineral and oil are being heated, the oil will dry readily and the paint will have a fine surface, a high luster, like the finest lacquer, and will be suitable for painting any very smooth surfaces—the bottoms of ships, pianos, bicycles, &c. This paint will not solidify in the cans, but will always be ready for use.

A product under my process does not lose any of the valuable properties of the mineral in its natural state. When allowed to harden, it retains all of the properties of the mineral. It is tough, hard, and somewhat elastic. It breaks with the same fracture, gives the same streak on paper, and burns with the same odor and the same flame as before treatment and when burned gives off the smell of burning india-rubber. The only apparent difference between wurtzilite in its natural state and prepared wurtzilite is the solubility of the latter in the volatile oils—such as naphtha, benzin, gasolene, bisulfid of carbon, ether, or any other solvent of india-rubber.

Owing to its insolubility wurtzilite, &c., has had no commercial value, and therefore has not been used in the arts. I am aware that one or more attempts have been made to render one or more grades of wurtzilite useful for commercial purposes, but in each case the mineral was subjected to a temperature of from 500° to 1,000° Fahrenheit, thereby depriving the mineral of its natural characteristics, which are retained when my process is employed.

I am, so far as I know, the original discoverer of a solvent of wurtzilite, &c., whereby the mineral may be reduced to a plastic mass or to a solution for use in commerce without depriving the mineral of any of its qualities which render it so valuable in the arts where a good non-conductor of heat, cold, and electricity or any material that is impervious to moisture is desired.

As wurtzilite, &c., has heretofore possessed no commercial value in the absence of any practical process for preparing it for use without destroying the very qualities which make it valuable in commerce and as my process is very simple and inexpensive, it will be understood that my invention opens up a wide field of use for this heretofore valueless mineral. It will be understood that a solution of any desired degree of consistency can be prepared according to the relative amounts of ingredients used, producing a material with any degree of consistency from that of a liquid to that of a tough plastic mass, from which any excess of the solvent may be driven off or allowed to evaporate without changing any of the characteristics of my prepared wurtzilite, &c.; also, that any desired state of consistency will be governed by the addition of oils, driers, pigments, &c., which are generally used in paints, varnishes, lacquers, &c.

Prepared wurtzilite may be alloyed with rubber or rubber solution in the solvents mentioned, and they will form a consistent homogeneous mass. This homogeneous mass composed of prepared wurtzilite and rubber in a common solvent is similar to an alloy. It has the properties of both the prepared wurtzilite and the rubber, the prepared wurtzilite becoming more elastic and the rubber more tough when in the alloy. This homogeneous mass can be used for similar purposes and uses as rubber. In this alloy of prepared wurtzilite and rubber the adulterants of rubber may be used in the place of the rubber.

Instead of applying the heat to the wurtzilite or prepared wurtzilite after it has been mixed with the oil the oil may be heated before it is mixed with the wurtzilite, &c.

It will be understood that I herein make no claim for a plastic composition consisting of wurtzilite and rubber, as the same is the subject-matter of an application filed by me on May 26, 1902, Serial No. 109,089.

Having thus described my invention, what I claim as new, and desire to secure by Letters Patent, is—

1. The process of dissolving wurtzilite by subjecting it to the solvent action of petroleum or its distillates.

2. The process of dissolving wurtzilite by a finely-divided or pulverized condition to the solvent action of petroleum.

3. The process of dissolving wurtzilite by subjecting it to the solvent action of petroleum or its distillates, in the presence of heat.

4. The process of dissolving wurtzilite in a pulverized or finely-divided condition by subjecting it to the solvent action of petroleum in the presence of heat.

5. The process of treating wurtzilite which consists in dissolving it in petroleum and then removing the solvent until the mass becomes consistent.

6. The process of dissolving prepared wurtzilite in any of the ordinary solvents of rubber.

7. A consistent mass obtained by dissolving wurtzilite in petroleum, removing the solvent till the mass becomes consistent, said mass being characterized by its resemblance to rubber, solubility in the solvents of rubber, conchoidal fracture when hard, brown color, giving a brown streak, and of a dark orange-red, verging to brown when viewed by transmitted light.

8. A substance having substantially all the properties of wurtzilite, except its insolubility in the solvents of rubber.

9. A solution of wurtzilite in petroleum.

10. A solution of wurtzilite in petroleum or its distillates.

11. A solution of wurtzilite, prepared as described, in any of the ordinary solvents of rubber.

In testimony whereof I affix my signature in presence of two witnesses.

SAMUEL RUCKER WHITALL.

Witnesses:
EDWIN B. H. TOWN, Jr.,
W. CLARENCE DUVALL.